US009135130B2

(12) United States Patent
Dong et al.

(10) Patent No.: US 9,135,130 B2
(45) Date of Patent: Sep. 15, 2015

(54) DEBUGGING METHOD, CHIP, BOARD, AND SYSTEM

(71) Applicant: Huawei Technologies Co., Ltd., Shenzhen, Guangdong (CN)

(72) Inventors: Jieming Dong, Shanghai (CN); Weihua Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 13/899,194

(22) Filed: May 21, 2013

(65) Prior Publication Data
US 2013/0326280 A1 Dec. 5, 2013

(30) Foreign Application Priority Data

May 31, 2012 (CN) .......................... 2012 1 0176833

(51) Int. Cl.
G06F 11/00 (2006.01)
G06F 11/22 (2006.01)
G06F 11/263 (2006.01)
G06F 11/273 (2006.01)

(52) U.S. Cl.
CPC .......... *G06F 11/2236* (2013.01); *G06F 11/263* (2013.01); *G06F 11/221* (2013.01); *G06F 11/2733* (2013.01)

(58) Field of Classification Search
CPC ... G06F 11/2205; G06F 11/26; G06F 11/263; G06F 11/273
See application file for complete search history.

(56) References Cited

U.S. PATENT DOCUMENTS

| 7,506,233 B2* | 3/2009 | Yamada ........................ 714/731 |
| 7,689,865 B2* | 3/2010 | Baier et al. ...................... 714/30 |
| 2002/0046016 A1 | 4/2002 | Debling |
| 2011/0194425 A1 | 8/2011 | Li et al. |
| 2012/0036351 A1* | 2/2012 | Peet et al. ..................... 713/150 |

FOREIGN PATENT DOCUMENTS

| CN | 1464648 A | 12/2003 |
| CN | 101196557 A | 6/2008 |

OTHER PUBLICATIONS

Shan Tang, et al., "A Debug Probe for Concurrently Debugging Multiple Embedded Cores and Inter-Core Transactions in NoC-Based Systems", IEEE, 2008, p. 416-421.
Be Van Ngo, et al., "Use of JTAG Boundary-Scan for Testing Electronic Circuit Boards and Systems", IEEE Autotestcon 2008, Sep. 8-11, 2008, 6 pages.

\* cited by examiner

*Primary Examiner* — Joseph Kudirka

(57) ABSTRACT

Embodiments of the present invention provide a debugging method, a chip, a board, and a system and relate to the communications field. Remote debugging can be performed on a board having no main control CPU without affecting hardware distribution and software performance. The method includes: receiving, by an Ethernet port, a data packet and determining a current service type according to a service identifier carried in the data packet; when determining the current service type is a debugging service, writing the data packet into a memory through a bus and sending an interruption notification to a CPU through the bus; reading, by the CPU, the data packet from the memory according to the interruption notification, obtaining a debugging instruction by parsing the data packet, and sending the debugging instruction to an ASIC through a protocol conversion module.

10 Claims, 3 Drawing Sheets

DEBUGGING METHOD, CHIP, BOARD, AND SYSTEM

CROSS-REFERENCE TO RELATED APPLICATIONS

This application claims priority to Chinese Patent Application No. 201210176833.4, filed on May 31, 2012, which is hereby incorporated by reference in its entirety.

FIELD OF THE INVENTION

The present invention relates to the communications field, and in particular, to a debugging method, a chip, a board, and a system.

BACKGROUND OF THE INVENTION

In the development of a network device and the subsequent maintenance process of the network device, debugging is an indispensable step. With the rapid development of Internet technologies, the testability and maintainability technology becomes a new technology and remote debugging that functions as a key technical point in the testability and maintainability technology draws people's attention.

In the existing remote debugging technology, a terminal runs debugging software by sending, through an Ethernet port, a debugging instruction to a main control CPU of a board to be debugged; a soft probe (soft probe) embedded in the main control CPU parses the debugging instruction and an FPGA/CPLD (Field-programmable Gate Array/Complex Programmable Logic Device, field-programmable gate array/complex programmable logic device) in which a protocol converter is embedded sends the debugging instruction to an ASIC on a chip SOC (System on Chip, system on chip); the ASIC executes a debugging operation and sends a debugging result to the main control CPU through the FPGA/CPLD; the main control CPU packages the debugging result and returns it to the terminal through the Ethernet port; and the terminal performs fault locating according to the debugging result.

In the process of implementing the debugging, the inventor finds that the prior art at least has the following problems: some boards has no main control CPU and the existing debugging solution cannot be executed; and in addition, the protocol converter is embedded in the FPGA/CPLD, which increases the overall cost of a board.

SUMMARY OF THE INVENTION

Embodiments of the present invention provide a debugging method, a chip, a board, and a system. Remote debugging can be performed on a board having no main control CPU without affecting hardware distribution and software performance.

To achieve the objectives, embodiments of the present invention adopt the following technical solutions:

A debugging method, includes:
  receiving, by an Ethernet port, a data packet sent by a terminal, where the data packet carries a service identifier and the service identifier includes a debugging service identifier or a normal service identifier;
  determining, by the Ethernet port, a current service type according to the service identifier carried in the data packet;
  writing, by the Ethernet port, the data packet into a memory through a bus and sending an interruption notification to a CPU through the bus when determining that the current service type is a debugging service;
  reading, by the CPU, the data packet from the memory according to the interruption notification, obtaining a debugging instruction by parsing the data packet, and sending the debugging instruction to a protocol conversion module;
  converting, by the protocol conversion module, the debugging instruction to a joint test action group JTAG code stream and sending the JTAG code stream to an application specific integrated circuit ASIC, so that the ASIC performs debugging according to the JTAG code stream and returns a debugging result to the protocol conversion module;
  returning, by the protocol conversion module, the debugging result to the CPU; and
  packing, by the CPU, the debugging result to a data packet of the debugging result and returning it to the terminal through the bus and the Ethernet port, so that the terminal performs fault locating according to the data packet of the debugging result.

A chip includes an application specific integrated circuit ASIC and a processing unit.

The processing unit includes an Ethernet port, a bus, a CPU, a memory, and a protocol conversion module, where:
  the Ethernet port is configured to receive a data packet sent by a terminal, where the data packet carries a service identifier and the service identifier includes a debugging service identifier or a normal service identifier;
  the Ethernet port is further configured to determine a current service type according to the service identifier carried in the data packet;
  the Ethernet port is further configured to, when determining that the current service type is a debugging service, write the data packet into the memory through the bus and send an interruption notification to the CPU through the bus;
  the CPU is configured to, according to the interruption notification, read the data packet from the memory, obtain a debugging instruction by parsing the data packet, and send the debugging instruction to the protocol conversion module; and
  the protocol conversion module is configured to convert the debugging instruction to a joint test action group JTAG code stream and send the JTAG code stream to the application specific integrated circuit ASIC.

The ASIC is configured to perform a debugging operation according to the JTAG code stream and return a debugging result to the protocol conversion module.

The protocol conversion module is further configured to return the debugging result to the CPU.

The CPU is further configured to pack the debugging result to a data packet of the debugging result and send it to the terminal through the bus and the Ethernet port, so that the terminal performs fault locating according to the data packet of the debugging result.

A board includes the chip.

A system includes a terminal and the board.

The preceding technical solutions provide a debugging method, a chip, a board, and a system. A processing unit that includes an Ethernet port, a bus, a CPU, a memory, and a protocol conversion module is embedded in the chip on the board to communicate with an ASIC on the chip for debugging service exchange. In this way, the debugging method is completed without affecting board hardware distribution and software performance. Meanwhile, when no main control CPU exists on the board, debugging can be completed by running the chip on the board to apply the technical solutions.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly and describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
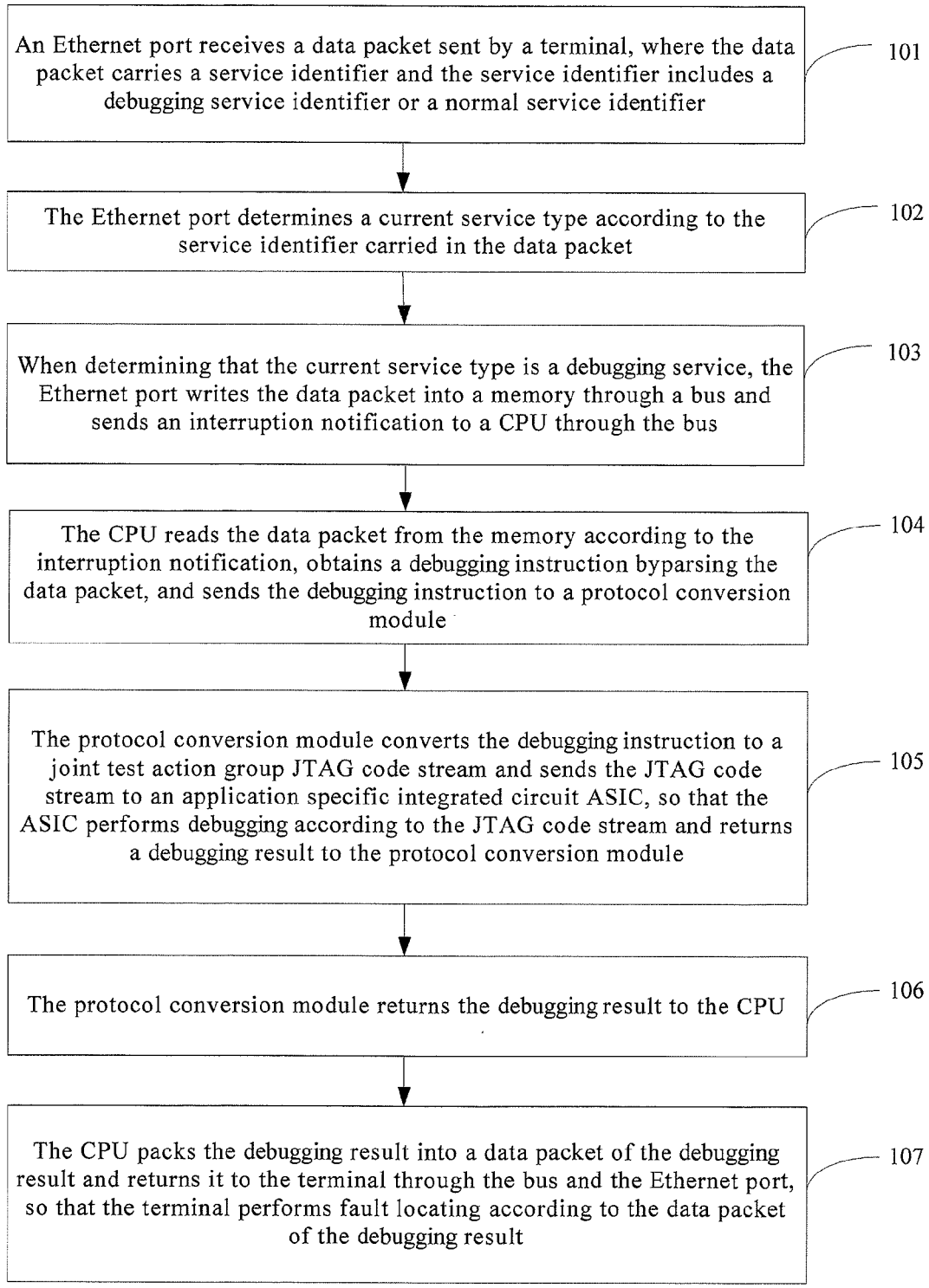
FIG. 1 is a flowchart of a debugging method according to an embodiment of the present invention.

An embodiment of the present invention provides a debugging method. As shown in FIG. 1, the method includes the following steps:

101. An Ethernet port receives a data packet sent by a terminal, where the data packet carries a service identifier and the service identifier includes a debugging service identifier or a normal service identifier.

In this embodiment, a terminal is connected to a chip through an Ethernet, and certainly, the terminal and the chip can also be connected to the Ethernet through a router. When a user or a debugging operator needs to run or debug the chip, the terminal may be enabled to send a data packet to the chip through the Ethernet. The chip is set with an Ethernet port and the chip can receive, through the Ethernet port, the data packet sent by the terminal. The data packet carries a service identifier and the service identifier includes a debugging service identifier or a normal service identifier. When the user runs the chip, the data packet sent by the terminal to the chip carries the normal service identifier; when the debugging operator debugs the chip, the data packet sent by the terminal to the chip carries the debugging service identifier.

102. The Ethernet port determines a current service type according to the service identifier carried in the data packet.

If the data packet received by the Ethernet port carries the normal service identifier, it is determined that the current service type is a normal service; if the data packet received by the Ethernet port carries the debugging service identifier, it is determined that the current service type is a debug service.

103. When determining that the current service type is the debugging service, the Ethernet port writes the data packet into a memory through a bus and sends an interruption notification to a CPU through the bus.

When determining that the current service type is the debugging service, the Ethernet port writes the data packet into the memory through the bus and sends the interruption notification to the CPU through the bus.

104. According to the interruption notification, the CPU reads the data packet from the memory, obtains a debugging instruction by parsing the data packet, and sends the debugging instruction to a protocol conversion module.

The CPU reads the data packet from the memory according to the received interruption notification. A Softprobe in the CPU may obtain the debugging instruction by parsing the data packet, encapsulate the debugging instruction to a data packet in a corresponding format stipulated by a bus protocol, and after the data packet is decoded by a decoder, the softprobe sends it to the protocol conversion module.

In this embodiment, the bus used by the chip is mainly an AXI (Advanced extensible Interface, advanced extensible interface) bus. The bus mentioned in this embodiment is an AXI small-bus, and a bus interface of the CPU may be an AXI protocol interface. Therefore, the CPU needs to encapsulate the debugging instruction to a data packet in AXI protocol format stipulated by the bus protocol and send it to the protocol conversion module. Optionally, the protocol conversion module is an AXI2JTAG (AXI to JTAG) protocol conversion module.

105. The protocol conversion module converts the debugging instruction to a JTAG (Joint Test Action Group, joint test action group) code stream and sends the JTAG code stream to an ASIC (Application Specific Integrated Circuit, application specific integrated circuit), so that the ASIC performs debugging according to the JTAG code stream and returns a debugging result to the protocol conversion module.

After receiving the debugging instruction, the protocol conversion module converts it from the format stipulated by the bus protocol to the JTAG code stream and sends the debugging instruction to the ASIC, so that the ASIC performs a debugging operation. The instruction received by the ASIC for performing the debugging operation must be in JTAG code stream format. After performing the debugging operation according to the debugging instruction in JTAG code stream format, the ASIC returns a debugging result to the protocol conversion module.

106. The protocol conversion module returns the debugging result to the CPU.

The debugging result is the JTAG code stream. After receiving the debugging result, the protocol conversion module converts the debugging result from a JTAG code stream format to a format stipulated by the bus protocol and returns it to the CPU through a bus interface.

107. The CPU packs the debugging result to a data packet of the debugging result and returns it to the terminal through the bus and the Ethernet port, so that the terminal performs fault locating according to the data packet of the debugging result.

After receiving the debugging result in the format stipulated by the bus protocol, the CPU packs the debugging result to an IP data packet and returns the data packet of the debugging result to the terminal through the bus and the Ethernet port. After receiving the data packet of the debugging result, the terminal obtains the debugging result by parsing the data packet of the debugging result, and debugging software analyzes it, so as to perform fault locating.

In the method, the Ethernet port and the CPU are mounted to an independent bus through master and slave interfaces of the bus and perform communication through the bus. Here, the probability of bus suspension is extremely low, and therefore it can be ensured that the debugging method of the present invention can be run for performing fault locating.

Figure 2:
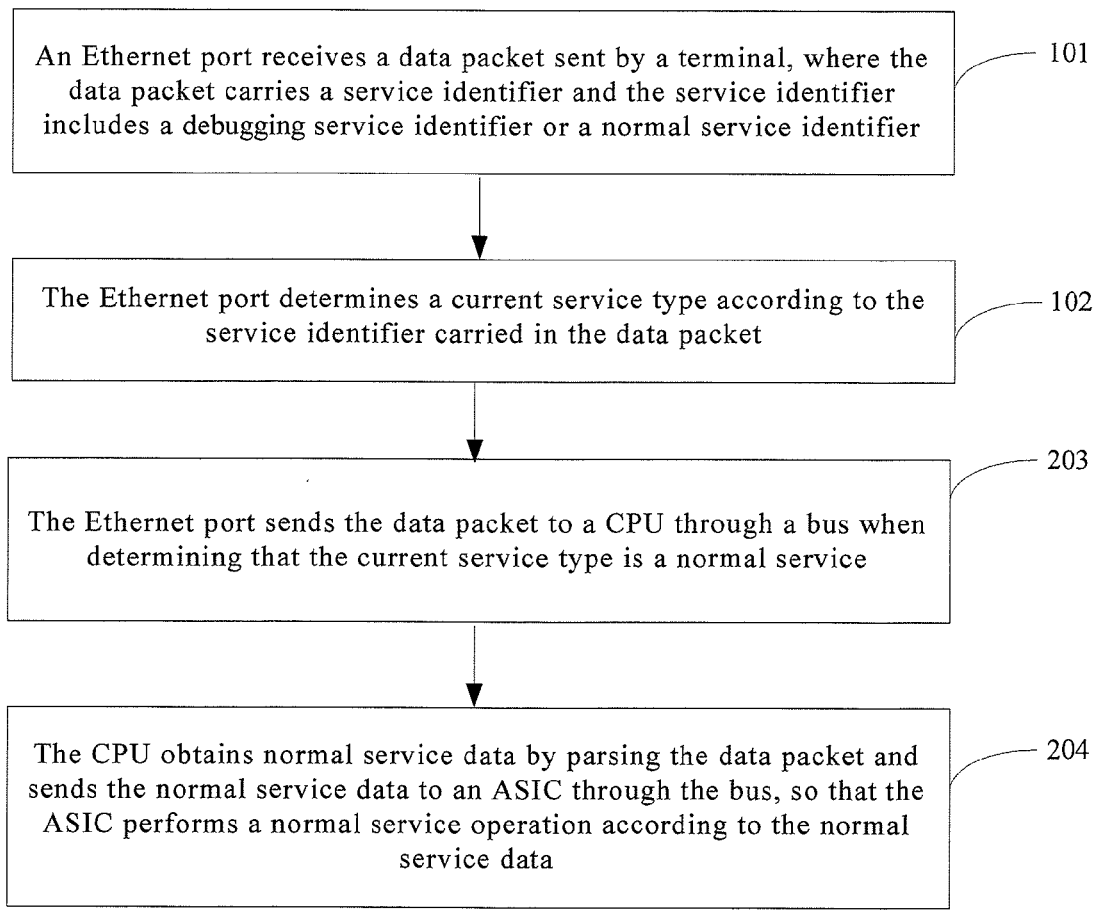
FIG. 2 is a flowchart of a method of running a normal service according to an embodiment of the present invention.

On the basis that the method is used for remote debugging, a normal service can still be performed while a CPU is being debugged. As shown in FIG. 2, the following steps are further performed after steps 101 and 102 are completed:

203. When determining that the current service type is a normal service, the Ethernet port sends the data packet to a CPU through a bus.

When determining that the current service type is the normal service according to the service identifier carried in the data packet, the Ethernet port may directly send the data packet to the CPU through the bus.

204. The CPU obtains normal service data by parsing the data packet, and sends the normal service data to an ASIC through the bus, so that the ASIC performs a normal service operation according to the normal service data.

The Softprobe in the CPU can obtain the normal service data by parsing the data packet and after the normal service data is decoded by a decoder, the softprobe sends it to the ASIC through the bus. The ASIC is set with a bus interface. Here, the bus may be an AXI small-bus and the corresponding bus interface is an AXI interface. The ASIC receives, through the bus interface, the data sent by the CPU through the bus 302. The ASIC can perform the corresponding normal service operation according to the service data.

Figure 3:
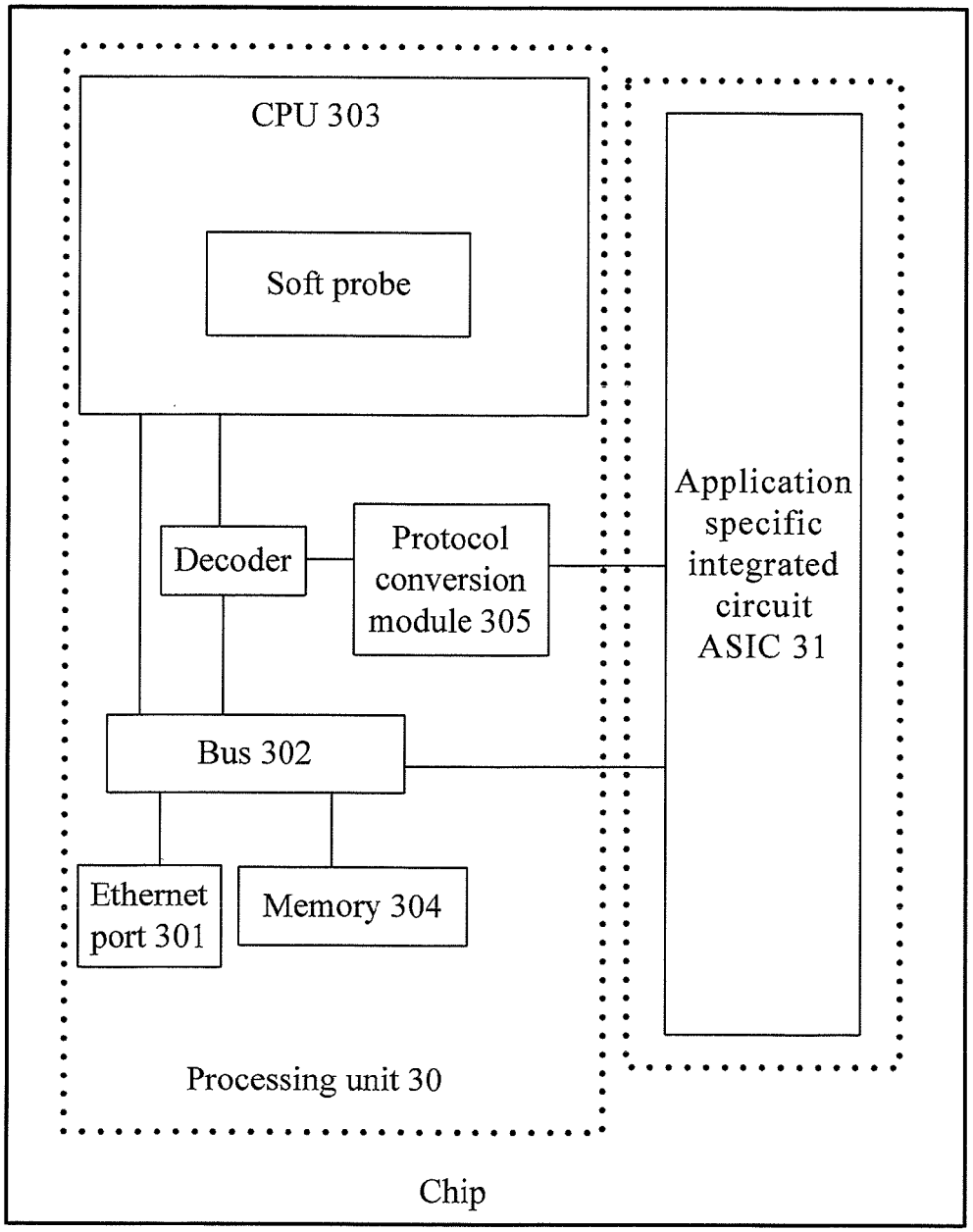
FIG. 3 is a structural block diagram of a chip according to an embodiment of the present invention.

An embodiment of the present invention further provides a chip. As shown in FIG. 3, the chip includes an ASIC 31 and a processing unit 30, where the processing unit 30 includes an Ethernet port 301, a bus 302, a CPU 303, a memory 304, and a protocol conversion module 305.

The Ethernet port 301 is configured to receive a data packet sent by a terminal, where the data packet carries a service identifier and the service identifier includes a debugging service identifier or a normal service identifier.

In this embodiment, a terminal is connected to the chip through an Ethernet, and certainly, the terminal and the chip can also be connected to the Ethernet through a router. When a user or a debugging operator needs to run or debug the chip, the terminal may be enabled to send a data packet to the chip through the Ethernet. The chip is set with the Ethernet port 301 and the chip can receive, through the Ethernet port 301, the data packet sent by the terminal. The data packet carries a service identifier and the service identifier includes a debugging service identifier or a normal service identifier. When the user runs the chip, the data packet sent by the terminal to the chip carries the normal service identifier; when the debugging operator debugs the chip, the data packet sent by the terminal to the chip carries the debugging service identifier.

The Ethernet port 301 is further configured to determine a current service type according to the service identifier carried in the data packet.

If the data packet received by the Ethernet port 301 carries the normal service identifier, it is determined that the current service type is a normal service; if the data packet received by the Ethernet port 301 carries the debugging service identifier, it is determined that the current service type is a debug service.

The Ethernet port 301 is further configured to, when determining that the current service type is a debugging service, write the data packet into the memory 304 through the bus 302 and send an interruption notification to the CPU 303 through the bus 302.

When determining that the current service type is the debugging service, the Ethernet port 301 writes the data packet into the memory 304 through the bus 302 first, and sends the interruption notification to the CPU 303 through the bus after the data packet is written into the memory 304.

The CPU 303 is configured to, according to the interruption notification, read the data packet from the memory 304, obtain a debugging instruction by parsing the data packet, and send the debugging instruction to the protocol conversion module 305.

The CPU 303 reads the data packet from the memory 304 according to the received interruption notification. A Softprobe in the CPU 303 may obtain the debugging instruction by parsing the data packet, encapsulate the debugging instruction to a data packet in a corresponding format stipulated by a bus protocol, and after the data packet is decoded by a decoder, the softprobe sends it to the protocol conversion module 305.

In this embodiment, the bus used by the chip is mainly an AXI bus. The bus 302 mentioned in this embodiment is an AXI small-bus, and a bus interface of the CPU 303 may be an AXI protocol interface. Therefore, the CPU needs to encapsulate the debugging instruction to a data packet in AXI protocol format stipulated by the bus protocol and send it to the protocol conversion module 305. Optionally, the protocol conversion module 305 is an AXI2JTAG protocol conversion module.

The protocol conversion module 305 is configured to convert the debugging instruction to a JTAG code stream and sends the JTAG code stream to the ASIC 31.

After receiving the debugging instruction, the protocol conversion module 305 converts it from a format stipulated by the bus protocol to the JTAG code stream, and sends the debugging instruction to the ASIC 31, so that the ASIC 31 performs a debugging operation. The instruction received by the ASIC 31 for performing the debugging operation must be in JTAG code stream format.

The ASIC 31 is configured to perform a debugging operation according to the JTAG code stream and return a debugging result to the protocol conversion module 305.

Here, the debugging result returned to the protocol conversion module 305 is in JTAG code stream format.

The protocol conversion module 305 is further configured to return the debugging result to the CPU 303.

The debugging result is the JTAG code stream. After receiving the debugging result, the protocol conversion module 305 converts the debugging result from a JTAG code stream format to a format stipulated by the bus protocol and returns it to the CPU 303 through the bus interface.

The CPU 303 is further configured to pack the debugging result to a data packet of the debugging result and send it to the terminal through the bus 302 and the Ethernet port 301, so that the terminal performs fault locating according to the data packet of the debugging result.

After receiving the debugging result in the format stipulated by the bus protocol, the CPU 303 packs the debugging result to an IP data packet and returns the data packet of the debugging result to the terminal through the bus 302 and the Ethernet port 301. After receiving the data packet of the debugging result, the terminal obtains the debugging result by parsing the data packet of the debugging result, and debugging software analyzes it, so as to perform fault locating.

The structure of the chip allows not only the running of the debugging method but also the running of a normal service.

When determining that the current service type is a normal service, the Ethernet port 301 sends the data packet to the CPU 303 through the bus 302.

When determining that the current service type is a normal service according to the service identifier carried in the data packet, the Ethernet port may directly send the data packet to the CPU 303 through the bus 302.

The CPU 303 is further configured to obtain normal service data by parsing the data packet and send the normal service data to the ASIC 31 through the bus.

The Softprobe in the CPU can obtain the normal service data by parsing the data packet and after the normal service data is decoded by the decoder, the softprobe sends it to the ASIC 31 through the bus 302. The ASIC 31 is set with a bus interface. Here, the bus 302 may be an AXI small-bus and the corresponding bus interface is an AXI interface. The ASIC 31 receives, through the bus interface, the data sent by the CPU 303 through the bus 302.

The ASIC 31 is further configured to perform a normal service operation according to the normal service data.

An embodiment of the present invention further provides a board, where the board includes any type of the chip. A processing unit that includes an Ethernet port, a bus, a CPU, a memory, and a protocol conversion module is embedded in the chip on the board. In this way, the debugging method is completed without affecting board hardware distribution and software performance. Meanwhile, when no main control CPU exists on the board, debugging can be completed by running the chip to apply the debugging method.

Figure 4:
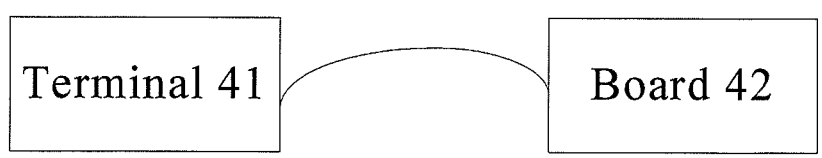
FIG. 4 is a block diagram of a system according to an embodiment of the present invention.

An embodiment of the present invention further provides a system, as shown in FIG. 4. The system includes a terminal 41 and a board 42.

The board 42 is the above board.

When the board 42 needs to be debugged, the terminal 41 is configured to send a data packet that carries a debugging service identifier to the board 42 through an Ethernet. A chip on the board 42 receives the data packet through an Ethernet port and determines a current service type according to the service identifier carried in the data packet; and when determining that the current service type is a debugging service, the chip writes the data packet to a memory through a bus and sends an interruption notification to a CPU through the bus. According to the interruption notification, the CPU reads the data packet from the memory, obtains a debugging instruction by parsing the data packet, and sends the debugging instruction to a protocol conversion module according to a bus protocol. The protocol conversion module converts the debugging instruction to a joint test action group JTAG code stream and sends the JTAG code stream to an application specific integrated circuit ASIC, so that the ASIC performs debugging according to the JTAG code stream and returns a debugging result to the protocol conversion module. The protocol conversion module returns the debugging result to the CPU. The CPU in the chip packs the debugging result to a data packet of the debugging result and returns it to the terminal 41 through the bus and the Ethernet port. That is, the board 42 sends the debugging result to the terminal 41, so that the terminal 41 performs fault locating according to the debugging result.

Of course, the terminal 41 is further configured to send a data packet that carries a normal service identifier to the board 42. The chip on the board 42 receives the data packet through the Ethernet port. When the Ethernet port of the chip determines that the current service type is a normal service, the Ethernet port sends the data packet to the CPU of the board through the bus. The CPU obtains normal service data by parsing the data packet and sends the normal service data to the ASIC of the board through the bus, so that the ASIC performs a normal service operation according to the normal service data.

Embodiments of the present invention provide a debugging method, a board, and a system. A processing unit that includes an Ethernet port, a bus, a CPU, a memory, and a protocol conversion module is embedded in the chip on the board to communicate with an ASIC on the chip for debugging service exchange. In this way, the debugging method is completed without affecting board hardware distribution and software performance. Meanwhile, when no main control CPU exists on the board, debugging can be completed by running the chip on the board to apply the technical solutions.

Persons of ordinary skill in the art may understand that all or part of the steps of the methods in the embodiments may be implemented by a program instructing relevant hardware. The program may be stored in a computer readable storage medium. When the program is run, the foregoing steps of the methods in the embodiments are performed. The storage medium may be any medium capable of storing program codes, such as ROM, RAM, magnetic disk, or optical disk.

The foregoing description is merely about the specific implementation of the present invention, but is not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A debugging method, comprising:
   receiving, by an Ethernet port, a data packet sent by a terminal, wherein the data packet carries a service identifier, and the service identifier comprises a debugging service identifier or a normal service identifier;
   determining, by the Ethernet port, a current service type according to the service identifier carried in the data packet;
   when determining that the current service type is a debugging service, writing, by the Ethernet port, the data packet into a memory through a bus, and sending an interruption notification to a central processing unit (CPU) through the bus;
   reading, by the CPU, the data packet from the memory according to the interruption notification, obtaining a debugging instruction by parsing the data packet, and sending the debugging instruction to a protocol conversion module;
   converting, by the protocol conversion module, the debugging instruction to a joint test action group (JTAG) code stream, and sending the JTAG code stream to an application specific integrated circuit (ASIC) so that the ASIC performs debugging according to the JTAG code stream and returns a debugging result to the protocol conversion module;
   returning, by the protocol conversion module, the debugging result to the CPU; and
   packing, by the CPU, the debugging result to a data packet of the debugging result, and returning the data packet of the debugging result to the terminal through the bus and the Ethernet port so that the terminal performs fault locating according to the data packet of the debugging result.

2. The method according to claim 1, further comprising:
   when determining that the current service type is a normal service, sending, by the Ethernet port, the data packet to the CPU through the bus; and
   obtaining, by the CPU, normal service data by parsing the data packet, and sending the normal service data to the ASIC through the bus so that the ASIC performs a normal service operation according to the normal service data.

3. The method according to claim 2, wherein the bus is an advanced extensible interface protocol (AXI) small-bus.

4. The method according to claim 3, wherein the protocol conversion module is an AXI2JTAG (AXI to JTAG) protocol conversion module.

5. A chip, comprising: an application specific integrated circuit (ASIC) and a processing unit, wherein:
the processing unit comprises an Ethernet port, a bus, a central processing unit (CPU), a memory, and a protocol conversion module;
the Ethernet port is configured to receive a data packet sent by a terminal, wherein the data packet carries a service identifier, and the service identifier comprises a debugging service identifier or a normal service identifier;
the Ethernet port is further configured to determine a current service type according to the service identifier carried in the data packet;
the Ethernet port is further configured to, when determining that the current service type is a debugging service, write the data packet into the memory through the bus and send an interruption notification to the CPU through the bus;
the CPU is configured to, according to the interruption notification, read the data packet from the memory, obtain a debugging instruction by parsing the data packet, and send the debugging instruction to the protocol conversion module;
the protocol conversion module is configured to convert the debugging instruction to a joint test action group (JTAG), code stream and send the JTAG code stream to the ASIC;
the ASIC is configured to perform a debugging operation according to the JTAG code stream and return a debugging result to the protocol conversion module;
the protocol conversion module is further configured to return the debugging result to the CPU; and
the CPU is further configured to pack the debugging result to a data packet of the debugging result and send the data packet of the debugging result to the terminal through the bus and the Ethernet port so that the terminal performs fault locating according to the data packet of the debugging result.

6. The chip according to claim 5, wherein:
the Ethernet port is further configured to, when determining that the current service type is a normal service, send the data packet to the CPU through the bus;
the CPU is further configured to obtain normal service data by parsing the data packet and send the normal service data to the ASIC through the bus; and
the ASIC is further configured to perform a normal service operation according to the normal service data.

7. The chip according to claim 6, wherein the bus is an advanced extensible interface protocol (AXIS) small-bus.

8. The method according to claim 7, wherein the protocol conversion module is an AXI2JTAG (AXI to JTAG) protocol conversion module.

9. A board, comprising a chip, wherein the chip is the chip according to claim 5.

10. A debug system, comprising a terminal and a board, wherein the board is the board according to claim 9.

* * * * *